(12) United States Patent
Mittal

(10) Patent No.: US 6,308,262 B1
(45) Date of Patent: Oct. 23, 2001

(54) SYSTEM AND METHOD FOR EFFICIENT PROCESSING OF INSTRUCTIONS USING CONTROL UNIT TO SELECT OPERATIONS

(75) Inventor: Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/163,521

(22) Filed: Sep. 30, 1998

(51) Int. Cl.$^7$ .............................. G06F 15/00; G06F 9/30; G06F 9/40; G06F 9/44
(52) U.S. Cl. .................... 712/229; 712/214; 712/225
(58) Field of Search ........................ 712/229, 226, 712/227, 32, 209, 213, 208, 245, 31, 23, 212, 220, 42, 217, 24, 215

(56) References Cited

U.S. PATENT DOCUMENTS

| | | | |
|---|---|---|---|
| 4,942,525 | * 7/1990 | Shintani et al. | 712/217 |
| 5,539,911 | * 7/1996 | Nguyen et al. | 712/23 |
| 5,590,296 | * 12/1996 | Matsuo | 712/229 |
| 5,671,382 | * 9/1997 | Shintani et al. | 712/215 |
| 5,689,720 | * 11/1997 | Nguyen et al. | 712/23 |
| 5,802,360 | * 9/1998 | Fernando | 712/229 |
| 5,805,918 | * 9/1998 | Blomgren et al. | 712/43 |
| 5,860,151 | * 1/1999 | Austin et al. | 712/213 |
| 5,878,243 | * 3/1999 | Eickemeyer et al. | 712/217 |
| 5,918,031 | * 6/1999 | Morrison et al. | 712/208 |
| 5,930,490 | * 7/1999 | Bartkowiak | 712/203 |
| 5,983,337 | * 11/1999 | Mahalingaiah et al. | 712/32 |
| 6,026,479 | * 2/2000 | Fisher et al. | 712/24 |
| 6,038,654 | * 3/2000 | Nguyen et al. | 712/23 |
| 6,052,771 | * 4/2000 | Heller, Jr. et al. | 712/31 |
| 6,092,183 | * 7/2000 | Takewa et al. | 712/215 |

* cited by examiner

*Primary Examiner*—Thomas Lee
*Assistant Examiner*—Chun Cao
(74) *Attorney, Agent, or Firm*—Blakely, Sokoloff, Taylor & Zafman LLP

(57) ABSTRACT

An apparatus and method for performing efficient processing of instructions is described. In one embodiment, a processor comprises a storage area to store a data operand and a control unit that is coupled to the storage area. A first circuit is coupled to the storage area and the control unit, which performs a first operation under a first condition. A second circuit is coupled to the storage area and the control unit, which performs a second operation under a second condition. The control unit operates on data elements in the data operand to process an instruction, and determines if processing of the instruction is to be performed under the second condition. If so, the second circuit is selected to process the instruction, otherwise the first circuit is selected to process the instruction. Various embodiments are disclosed.

37 Claims, 13 Drawing Sheets

SYSTEM AND METHOD FOR EFFICIENT PROCESSING OF INSTRUCTIONS USING CONTROL UNIT TO SELECT OPERATIONS

BACKGROUND OF THE INVENTION

1. Field of the Invention

The present invention relates in general to the field of computer systems, and in particular, to an apparatus and method for performing efficient processing of instructions.

2. Description of the Related Art

Efficient processing of instructions in processors results in increased system performance. However, the processing of instructions is not always optimized. For example, address computation in processors that conform to the Intel Architecture (IA) 32 format typically requires the addition of three values, namely, the segment base address, the base address of the address within the segment [hereinafter "base address"] and an offset. A 3-input adder(s) is typically used to provide such address computation. In some of the more aggressive processor designs, the performance of a 3-input add may require 2 processor clock cycles, while a 2-input add may be performed within a single processor clock cycle.

Increased address computation latency results in performance degradation, particularly in applications which exhibit a large number of address generation interlocks. Accordingly, there is a need in the technology for providing an apparatus and method for performing efficient processing of instructions, such as address computation, so as to avoid the aforementioned problems.

BRIEF SUMMARY OF THE INVENTION

An apparatus and method for performing efficient processing of instructions is described. In one embodiment, a processor comprises a storage area to store a data operand and a control unit that is coupled to the storage area. A first circuit is coupled to the storage area and the control unit, which performs a first operation under a first condition. A second circuit is coupled to the storage area and the control unit, which performs a second operation under a second condition. The control unit operates on data elements in the data operand to process an instruction, and determines if processing of the instruction is to be performed under the second condition. If so, the second circuit is selected to process the instruction, otherwise the first circuit is selected to process the instruction. Various embodiments are disclosed.

BRIEF DESCRIPTION OF THE DRAWINGS

The invention is illustrated by way of example, and not limitation, in the figures. Like reference indicate similar elements.

DETAILED DESCRIPTION OF THE INVENTION

The present invention involves an apparatus and method for efficiently processing instructions. In one embodiment, the present invention determines if the execution of the instruction requires an operation that is performed under a constraint. If so, a circuit for performing the operation under constraint is selected for executing the instruction. Otherwise, a circuit for performing the operation under no constraint is selected for executing the instruction. Examples of the constraint include processing the instruction in fewer cycles than a predetermined number or processing of the instruction using a circuit having fewer inputs than a predetermined number.

In another embodiment, the present invention determines if an instruction is one that can change the mode bit of a control unit. In one embodiment, the mode bit has a value that indicates the selection of one of two circuits for executing the instruction. One example of such an instruction is a load segment instruction. If the instruction is one that can change the mode bit, one of three options may be selected for performing the operation. The first option includes executing the current instruction in accordance with the mode bit, but stalling all following dependent instructions affected by the status of the mode bit until the execution of the current instruction is complete. The second option includes speculatively setting the mode bit to use a circuit that performs the operation under the constraint. The operation is then performed and a determination of whether the mode bit was set correctly is then made. If the mode bit was set correctly, the process for performing the second option terminates. However, if the mode bit was not set correctly, the execution pipeline is flushed and a logic bit is changed to select the output of a circuit that performs the operation without constraint. The instruction is then re-executed. The third option includes setting the mode bit to use a circuit that performs the operation without a constraint. The operation is then performed and a determination of whether the mode bit was set correctly is made. If the mode bit was set correctly, the process for performing the third option terminates. If the mode bit was set incorrectly, the logic bit is changed to select the output of a circuit that performs the operation under the constraint.

Figure 1:
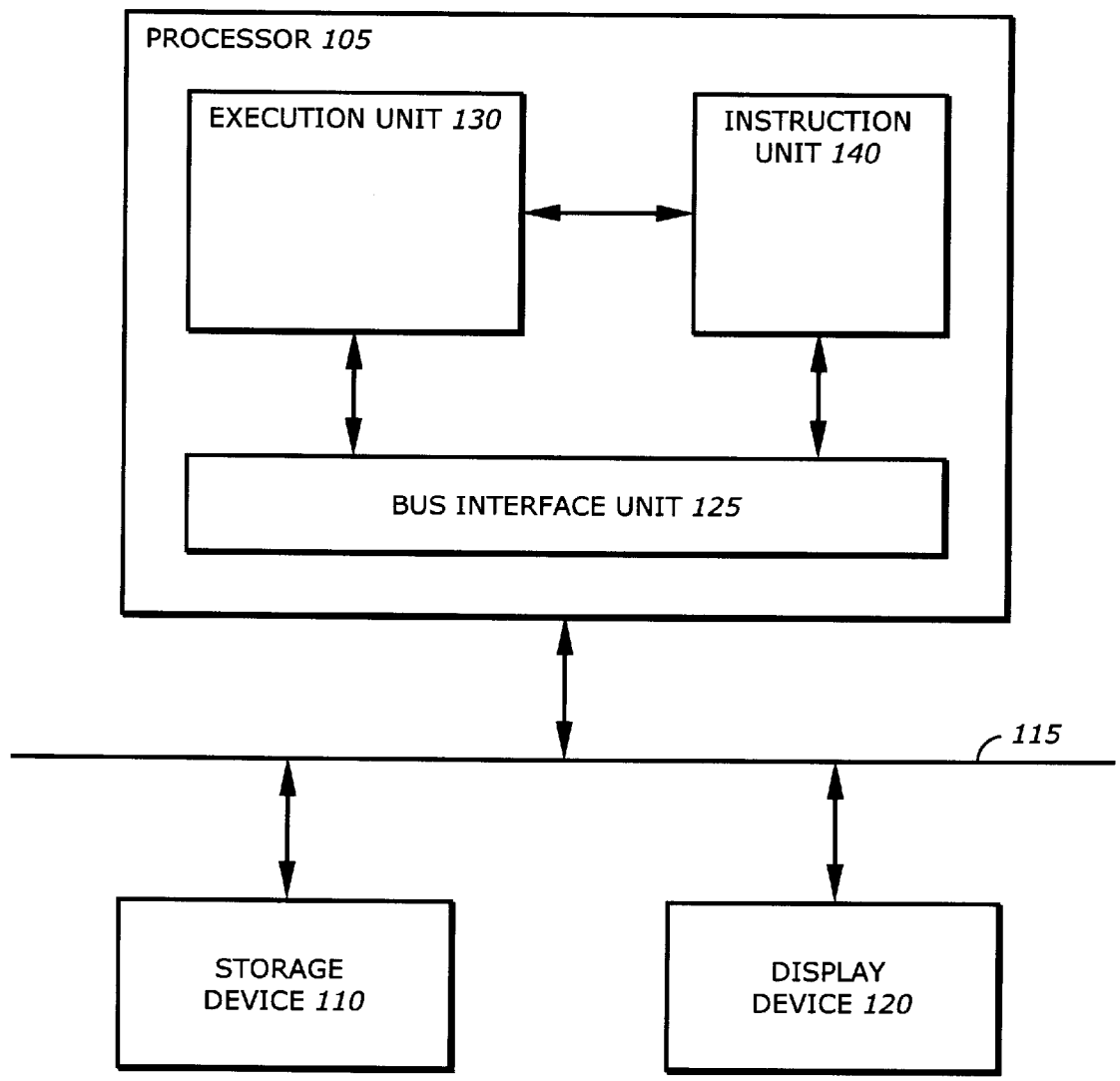
FIG. 1 illustrates one embodiment of a computer system 100 which implements the principles of the present invention.

FIG. 1 illustrates one embodiment of a computer system 100 which implements the principles of the present invention. Computer system 100 comprises a processor 105, a storage device 110, and a bus. The processor 105 is coupled to the storage device 110 by the bus 115. In addition, a display device 120 is also coupled to the bus 115. It is understood that other user input/output devices, such as a keyboard may be coupled to the bus 115. The processor 105 represents a central processing unit of any type of architecture, such as multithreaded CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

The processor 105 comprises a bus interface unit 125, an execution unit 130 and an instruction unit 140. The bus interface unit 125 includes a prefetch queue (not shown) and interfaces with the bus 115, which may include a data bus, an address bus and a control bus. It fetches instructions from memory into the prefetch queue, which in turn transfers them to the instruction unit 140. The instruction unit 140 then controls the execution unit 130 to ensure that the instructions fetched are properly executed by the execution unit 130.

Figure 2A:
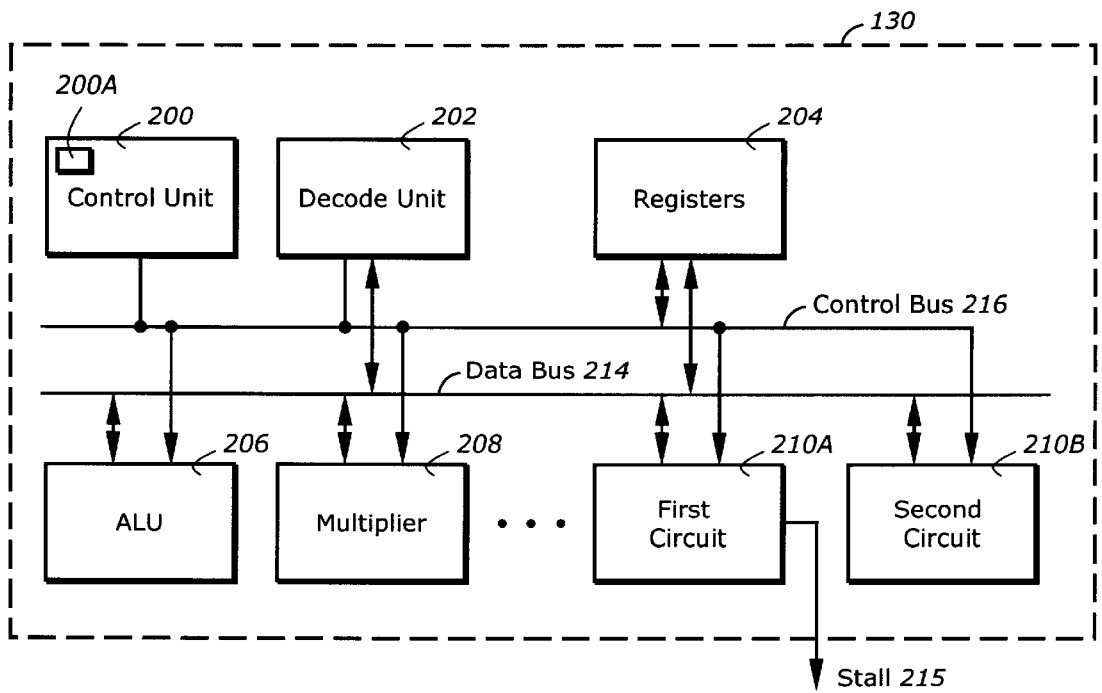
FIG. 2A illustrates one embodiment of the execution unit 130 in accordance with the present invention.

FIG. 2A illustrates one embodiment of the execution unit 130 in accordance with the present invention. The execution unit 130 comprises a control unit 200 that includes a mode bit 200A, a decode unit 202, a set of registers 204, an arithmetic and logic unit (ALU) 206, a multiplier, 208, a first circuit 210A and a second circuit 210B. Additional logic circuitry (not necessary to the understanding of the invention) may be included in the execution unit 130. The control unit 200 controls data processing within the execution unit 130. The decode unit 202 is used for decoding instructions received by processor 105 into control signals and/or microcode entry points. In response to these control signals and/or microcode entry points, the execution unit 130 performs the appropriate operations. The mode bit 200A has a value that indicates the selection of the first or the second circuit 210A or 210B for executing an instruction. In alternate embodiments, n mode bits may be implemented to facilitate selection of one or more of $2^n$ circuits for executing an instruction.

The decode unit 202 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention. The registers 204 represent a storage are on processor 105 for storing information, including control/status information, integer data, floating point data, and packed data.

The ALU 206, multiplier 208, the first and second circuits 210A and 210B, perform various arithmetic and logic computations. The registers 204, ALU 206, multiplier 208, first and second circuits 210A and 210B, are each coupled to a data bus 214. The control unit 200, decode unit 202 are coupled to one another via a control bus 216. In addition, the registers 204, ALU 206, multiplier 208, first and second circuits 210A and 210B are each coupled to the control bus 216.

Operation of the execution unit 130 will now be described. Based on previous operations, the mode bit 200A stores a value indicative of whether execution of an instruction requires an operation that is performed under a constraint. In one embodiment, the first circuit 210A is configured to perform the operation without the constraint and the second circuit 210B is configured to perform the operation under the constraint. During fetching an instruction, the mode bit 200A is examined to determine if the operation for executing the instruction is to be performed under a constraint. If so, the second circuit 210B (which performs the operation under the constraint) is selected for executing the instruction. Otherwise, the first circuit 210A is selected for performing the operation. Based on the value of the mode bit 200A, the control unit 200 can select the corresponding first or second circuit 210A or 210B that can most efficiently perform the required operation. The first circuit 210A may also issue a stall signal 215 to stall the execution of instructions that are dependent on the current instruction until execution of the current instruction is complete, as discussed in detail in the following sections. The present invention may also be extended to include third or fourth circuits and additional mode bits that indicate the selection of the first through fourth circuits, so as to facilitate selection of a circuit that can that can provide optimum performance of a particular operation. In alternate embodiments, the present invention may be extended to include the use of $2^n$ circuits and n mode bits to facilitate selection of one or more of the $2^n$ circuits for providing optimum performance.

By way of example, the first circuit 210A requires N clock cycles to perform an operation. The second circuit 210B requires M clock cycles to perform the same operation, where M<N. The mode bit 200A is first examined to determine if the operation can be performed in M cycles. If so, the second circuit 210B, which performs the operation in M cycles is selected for performing the operation. Otherwise, the first circuit 210A, is selected for performing the operation.

Figure 2B:
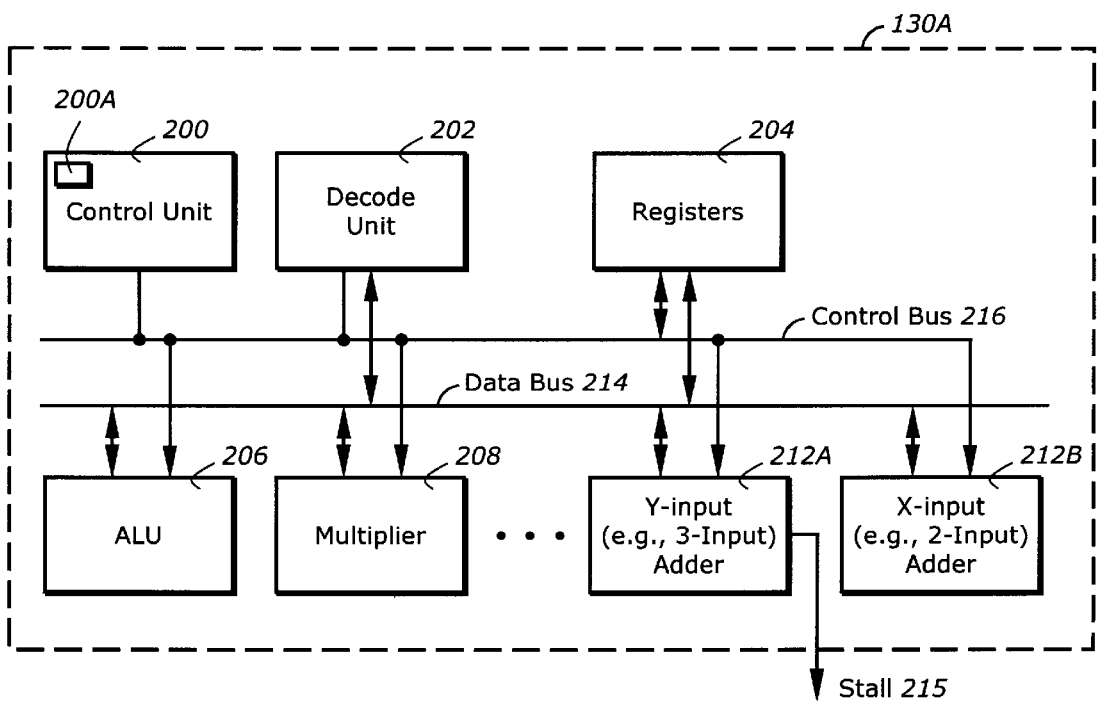
FIG. 2B illustrates one embodiment of the execution unit 130 of FIG. 2A in accordance with the present invention.

FIG. 2B illustrates one example of the execution unit 130 of FIG. 2A, provided in accordance with the present invention. The execution unit 130 comprises a control unit 200 that includes a mode bit 200A, a decode unit 202, a set of registers 204, an arithmetic and logic unit (ALU) 206, a multiplier, 208, a Y-input adder 212A and an X-input adder where X<Y. In one embodiment, X=2 and Y=3. The registers 204 represent a storage area on processor 105 for storing information, including control/status information, integer data, floating point data, and packed data.

The ALU 206, multiplier 208, the X-input adder 212B and Y-input adder 212A perform various arithmetic and logic computations. The Y-input adder 212A further generates a stall signal via signal line 215 to stall dependent instructions to the instruction currently being executed, as discussed in detail below. The registers 204, ALU 206, multiplier 208, X-input adder 212B and Y-input adder 212A are each coupled to a data bus 214. The control unit 200, decode unit 202 are coupled to one another via a control bus 216. In addition, the registers 204, ALU 206, multiplier 208, Y-input adder 212A and X-input adder 212B are each coupled to the control bus 216. The control unit 200, decode unit 202, registers 204, ALU 206, multiplier 208, data bus 214 and control bus 216 may be identical to those shown in FIG. 2A. In this example, the first and second circuits 210A and 210B of FIG. 2A are a Y-input and a X-input adder 212A and 212B respectively. The mode bit 200A is examined to determine the selection of either the Y-input or the X-input adder 212A or 212B for performing an operation, such as the addition of address segments. Based on the value of the mode bit 200A, the output of the respective Y-input adder 212A or X-input adder 212B will be subsequently latched to provide the resulting address.

Figure 2C:
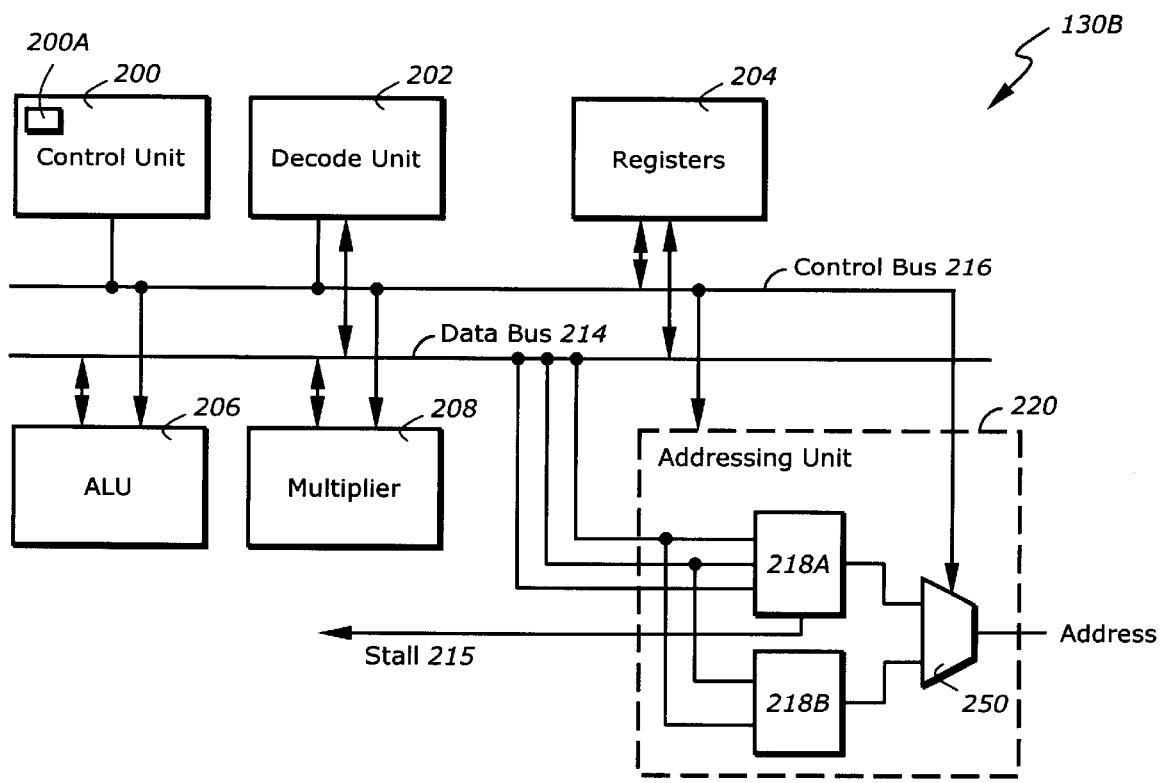
FIG. 2C illustrates a second embodiment of the execution unit 130 of FIG. 2A in accordance with the present invention.

FIG. 2C illustrates a second example of the execution unit 130 of FIG. 2A provided in accordance with the present invention. In this example, the first and second circuits 210A and 210B of FIG. 2A are represented by a 3-input adder 218A and a 2-input adder 218B, each having outputs that are provided to a multiplexer 250. In the embodiment shown in FIG. 2C, the two inputs of the 2-input adder 218B are coupled to two of the three inputs of the 3-input adder 218A. In alternate embodiments, the 2-input and the 3-input adders may be X-input and Y-input adders respectively, where X<Y. The three inputs of the 3-input adder 218A are then coupled to the data bus 214. The output of the 2-input adder 218B and the output of the 3-input adder 218A are provided to the multiplexer (MUX 250), which receives a control signal from the control unit 200 based on the value of the mode bit 200A, to latch in either of the outputs. The 3-input adder 218A also generates a stall signal via signal line 215 to stall dependent instructions for computing the address until the execution of the current instruction modifying the selector is complete, as discussed in detail below. Based on the value of the mode bit 200A, the output of the respective 2-input adder 218B or 3-input adder 218A will be subsequently latched to provide the resulting address.

Figure 2D:
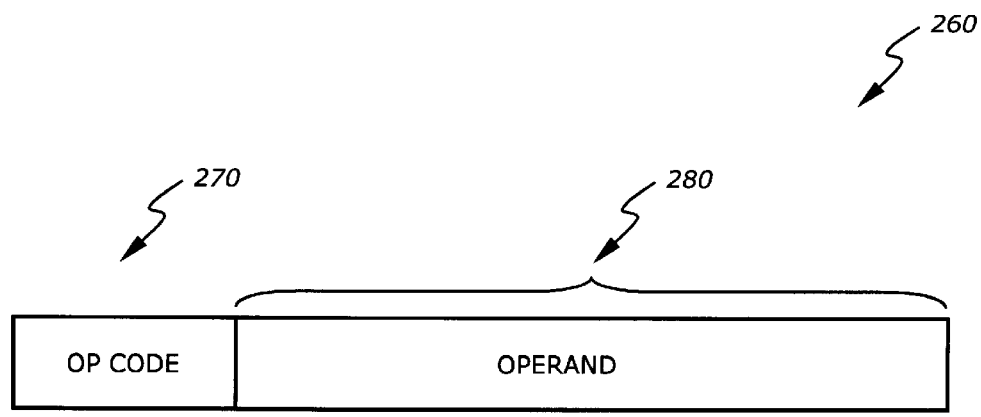
FIG. 2D illustrates one embodiment of an instruction 260 provided in accordance with the principles of the present invention.

FIG. 2D illustrates one embodiment of an instruction that is used according to the principles of the present invention. The instruction 260 comprises an operational code 270 and an operand 280. In one embodiment, the operand includes data elements in the operand 280 which respectively represent locations of a segment base address and a base address. The offset for the address computation may be stored in one of the general registers in the set of registers 204. As is known in the technology, certain types of instructions, such as load segment instructions, may alter the mode bit 200A of the control unit.

In the embodiments shown in FIGS. 2B and 2C, the processor 105 operates to provide the linear address for applications running on the computer system 100's operating system. The computation of the linear address typically involves the addition of the three values, namely, the segment base address, the base address of the address within the segment and an offset. However, the operating systems, for example, 32-bit operating systems such as the Unix or WinNT operating systems, are typically configured such that the segment bases are pinned to zero. For example, in the WinNT operating system, all segments except for the extra segments such as the FS segments, have a segment base address that is zero. In such cases, a 2-input addition, i.e., the addition of the base address and the offset, instead of a 3-input addition, is sufficient for all the accesses except for those using the FS selector.

The present invention thus provides an apparatus and technique for efficiently processing an instruction by: (1) determining if the execution of the instruction requires an operation that is performed under a constraint. If so, a circuit for performing the operation under constraint is selected for executing the instruction. Otherwise, a circuit for performing the operation under no constraint is selected for executing the instruction. Examples of the constraint include executing the instruction in fewer cycles of executing the instruction using an adder having fewer inputs; (2) determining if an instruction is one that can change the mode bit of an operation, such as a load segment instruction. If so, one of three options may be selected for performing the operation. The first option includes executing the current instruction (that is altering the mode bit 200A) but stalling all following dependent instructions affected by the status of the mode bit until the execution of the current instruction is complete. The second option includes speculatively setting the mode bit to use a circuit that performs the operation under the constraint. The operation is then performed and a determination of whether the mode bit was set correctly is then made. If the mode bit was set correctly, the process for performing the second option terminates. However, if the mode bit was not set correctly, the execution pipeline is flushed and a logic bit is changed to select the output of a circuit that performs the operation without constraint. The instruction is then re-executed. The third option includes setting the mode bit to use a circuit that performs the operation without a constraint. The operation is then performed and a determination of whether the mode bit was set correctly is made. If the mode bit was set correctly, the process for performing the third option terminates. If the mode bit was set incorrectly, the logic bit is changed to select the output of a circuit that performs the operation under the constraint.

Figure 3A:
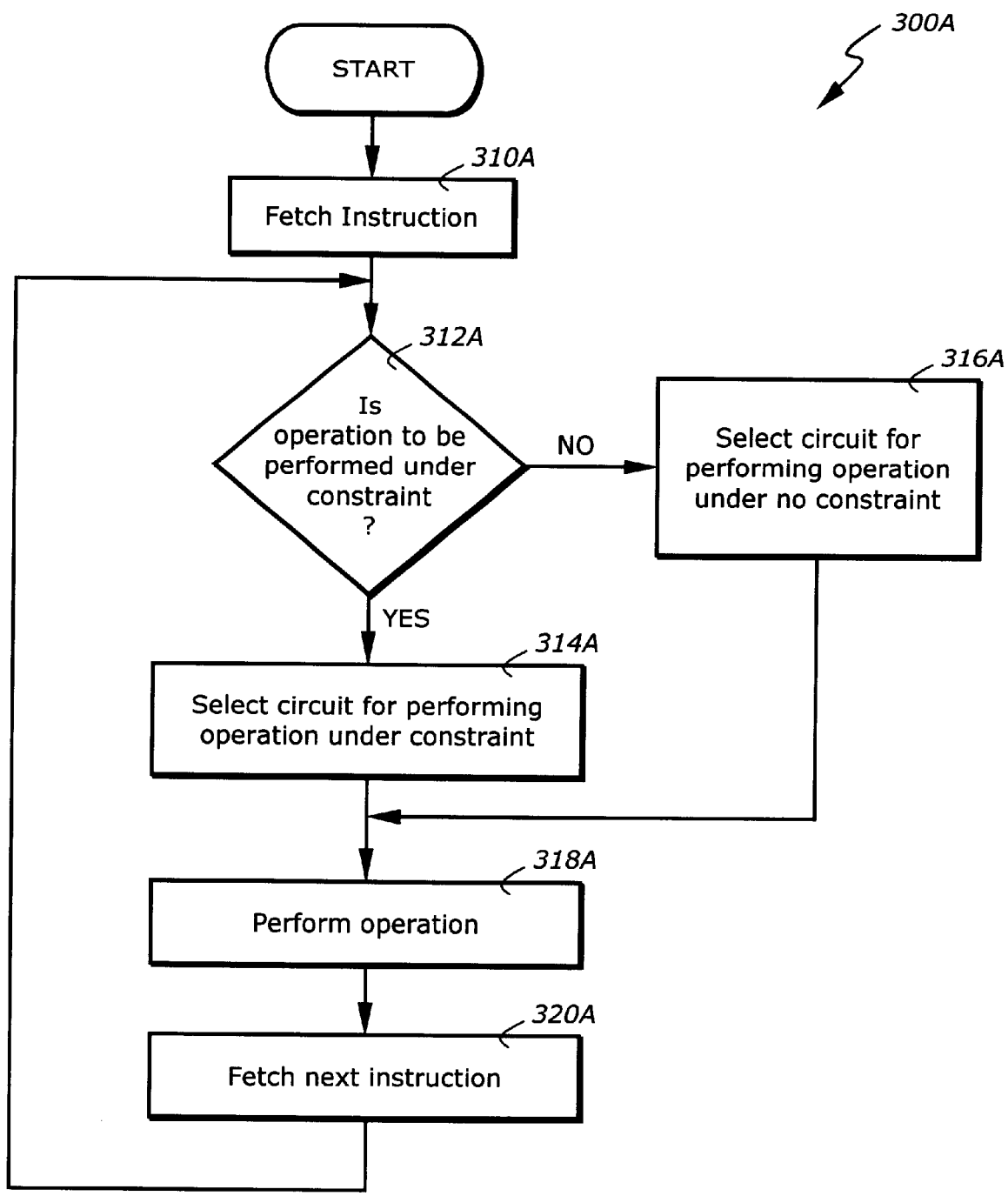
FIG. 3A is a flowchart illustrating one embodiment of an instruction processing method 300 in accordance with the present invention.

FIG. 3A is a flowchart illustrating one embodiment of the instruction execution process 300A of the present invention. The process 300A begins from a start state and proceeds to process block 310A, where it fetches an instruction. The process 300A then proceeds to a decision block 312 where it determines if the execution of the instruction requires an operation that is performed under a constraint. Examples of such a constraint include the performance of an add operation using a circuit having fewer inputs than a predetermined number (e.g., using X instead of Y inputs, where X<Y) or the performance of an add operation in fewer cycles than a predetermined number (e.g., in M cycles instead of N cycles, where M<N). If so, the process 300A proceeds to process block 314A where the circuit for performing the operation under the constraint, such as the second circuit 210B of FIG. 2A, or the X-input adder 212B of FIG. 2B or the 2-input adder 218B of FIG. 2C, is selected. Otherwise, the circuit for performing the operation without the constraint is selected, as shown in process block 316A. In either case (either of process blocks 314A or 316A), the process 300A proceeds to process block 318A, where the operation is performed. The process 300A then advances to process block 320A, where the next instruction is fetched, and subsequently continues back to decision block 312A.

Figure 3B:
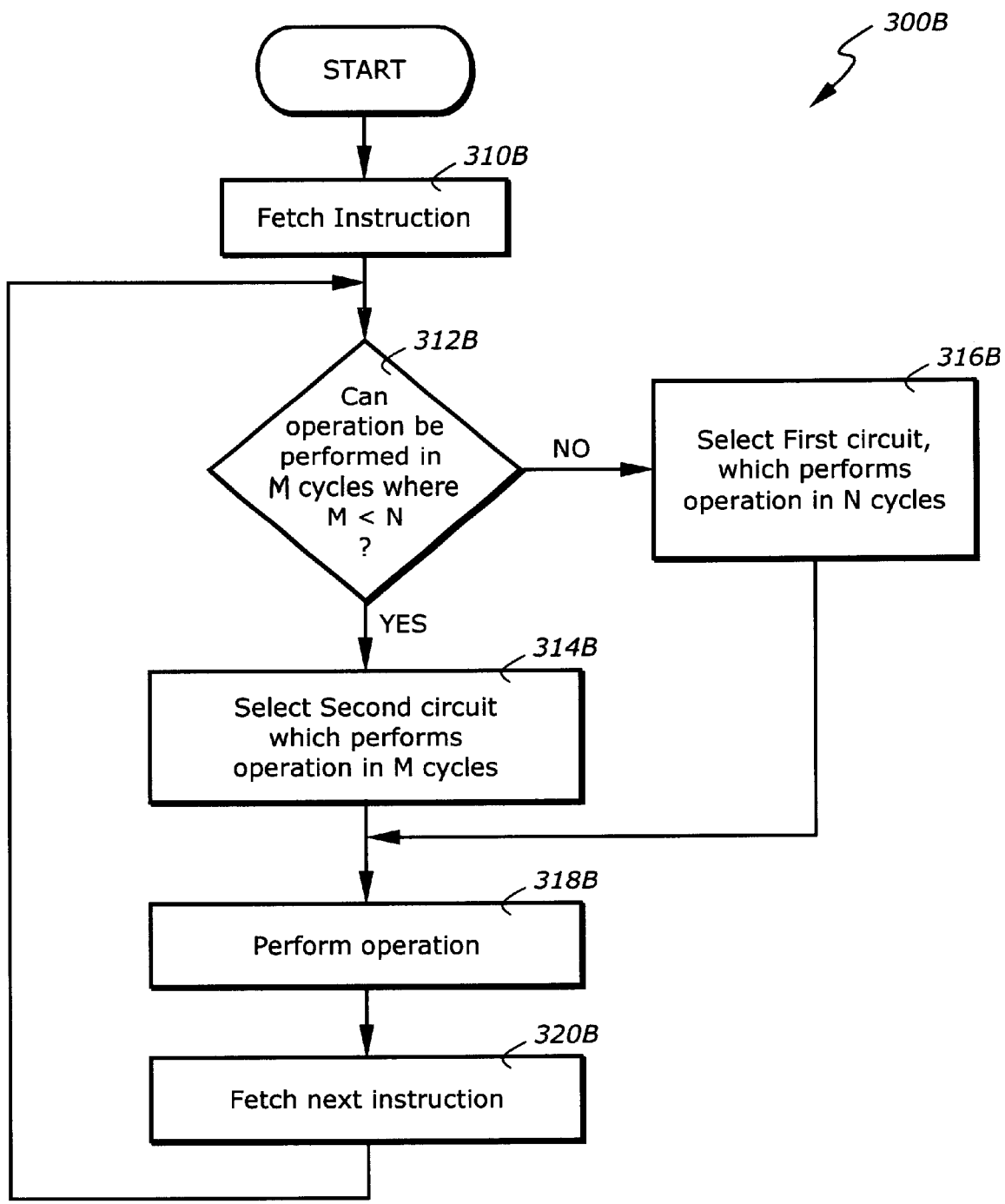
FIG. 3B is a flowchart illustrating one embodiment of the instruction processing method 300 of FIG. 3A.

FIG. 3B is a flowchart illustrating one embodiment of the instruction processing method 300A of FIG. 3A. The process 300B begins from a start state and proceeds to process block 310B, where it fetches an instruction. The process 300B then proceeds to a decision block 312B where it determines if the execution of the instruction requires an operation that is performed in M cycles, where M<N. Examples of M and N include M=2 and N=3. If so, the process 300B proceeds to process block 314B, where the circuit for performing the operation under the constraint, such as the second circuit 210B of FIG. 2A, is selected for performing the operation. Otherwise, the circuit for performing the operation in N cycles, such as the first circuit 210A of FIG. 2A, is selected, as shown in process block 316B. In either case (either of process blocks 314B or 316B), the process 300B proceeds to process block 318B, where the operation is performed. The process 300B then advances to process block 320B, where the next instruction is fetched, and subsequently continues back to decision block 312B.

Figure 3C:
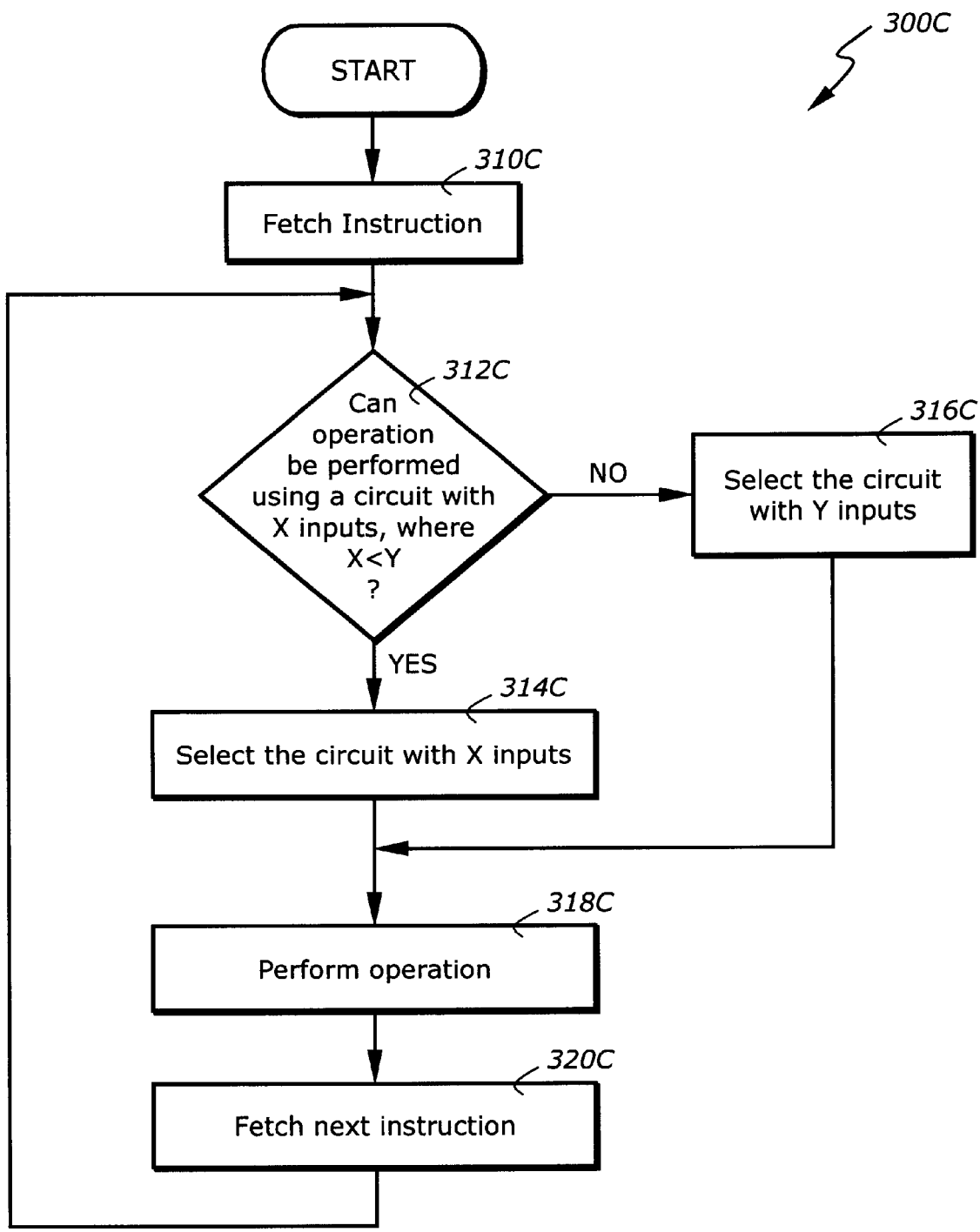
FIG. 3C is a flowchart illustrating a second embodiment of the instruction processing method 300 of FIG. 3A.

FIG. 3C is a flowchart illustrating a second embodiment of the instruction processing method 300A of FIG. 3A. The process 300C begins from a start state and proceeds to process block 310C, where it fetches an instruction. The process 300C then proceeds to a decision block 312C where it determines if the execution of the instruction requires an operation that is performed using a circuit with fewer inputs than a predetermined number. If so, the process 300C proceeds to process block 314C, where the circuit for performing the operation using a circuit having fewer inputs than a predetermined number, for example, using a circuit with X inputs, where X<Y, (such as the X-input adder 212B of FIG. 2B or the 2-input adder 218B of FIG. 2C), is selected for performing the operation. Otherwise, the circuit with inputs greater than or equal to the predetermined number, e.g., such as a Y input circuit (such as the Y-input adder 212A of FIG. 2B or the 3-input adder 218A of FIG. 2C), is selected, as shown in process block 316C. In either case (either of process blocks 314C or 316C), the process 300C proceeds to process block 318C, where the operation is performed. The process 300C then advances to process block 320C, where the next instruction is fetched, and subsequently continues back to decision block 312C.

Figure 4A:
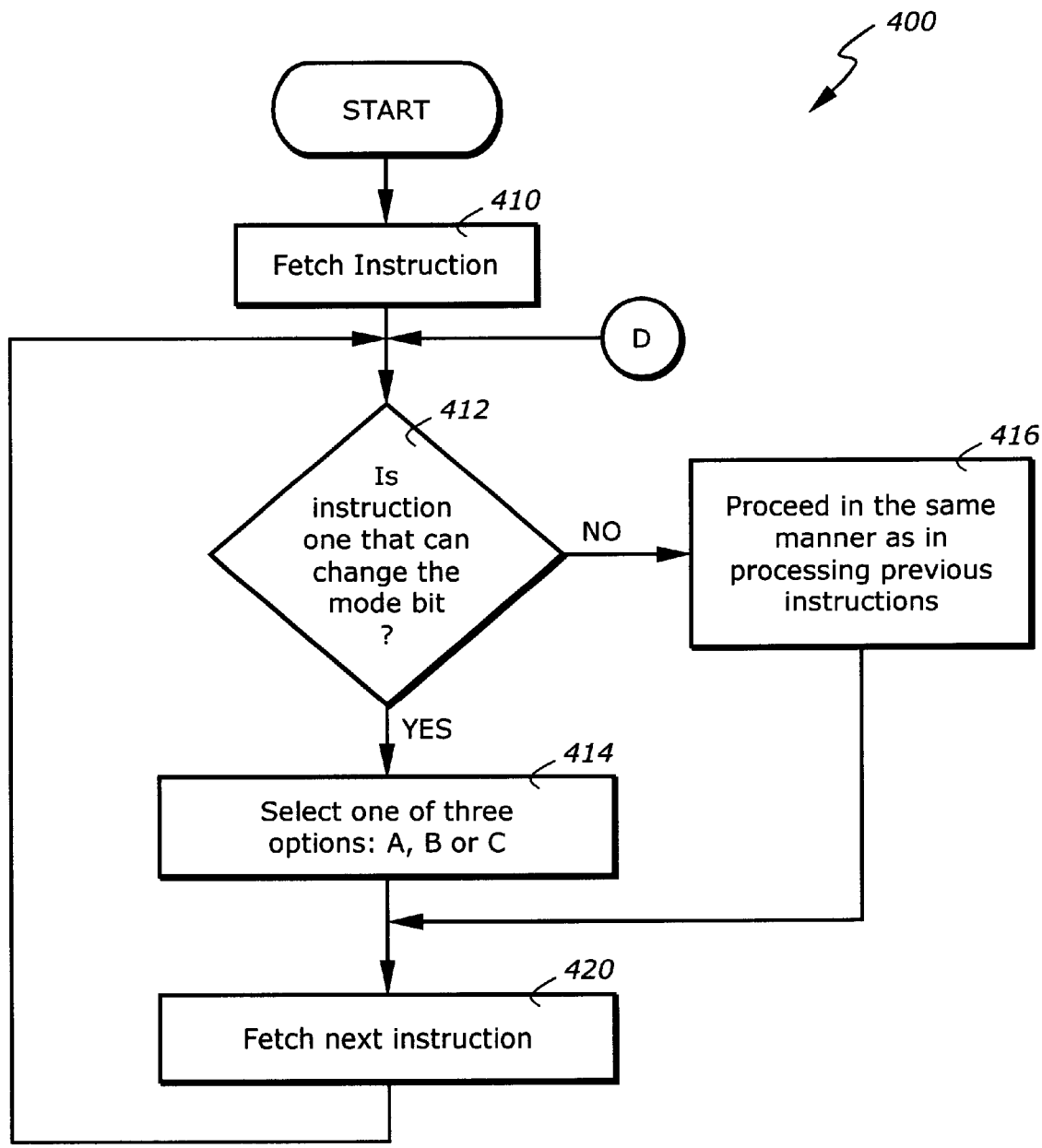
FIG. 4A is a flowchart illustrating a second embodiment of an instruction processing method 400 in accordance with the present invention.

FIG. 4A is a flowchart illustrating a second embodiment of an instruction processing method 400 in accordance with the present invention. The process 400 begins from a start state and proceeds to process block 410, where it fetches an instruction. The process 400 then proceeds to a decision block 412 where it queries if the fetched instruction is one that can change the mode bit 200A, such as a load segment instruction. If so, the process 400 proceeds to process block 414, where it selects one of three options: A, B or C (shown respectively in FIGS. 4B, 4C and 4D and as discussed below). Otherwise, the process 400 proceeds to process block 416, where it proceeds in the same manner as in processing previous instructions. In either case (414 or 416), the process 400 proceeds to process block 420, where it fetches the next instruction. The process 400 then continues back to decision block 412.

Figure 4B:
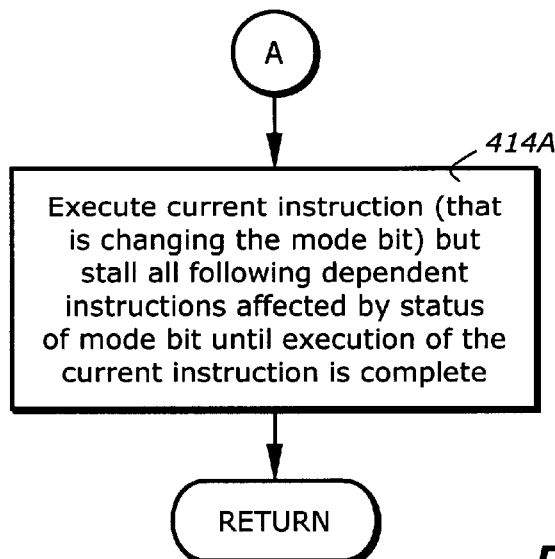
FIG. 4B is a flowchart illustrating one embodiment of process block 414 of FIG. 4A.

FIG. 4B is a flowchart illustrating one embodiment of the process block 414 of FIG. 4A. In this embodiment, process block 414 of FIG. 4A is replaced with the process block 414A, which represents option A. Here, the current instruction (that is changing the mode bit 200A) is executed but all following dependent instructions affected by the status of the mode bit 200A are stalled until the execution of the current instruction is complete.

By way of example, any one of: the first circuit 210A of FIG. 2A, the Y-input adder 212A of FIG. 2B, or the 3-input adder 218A of FIG. 2C, is selected for performing the operation. During execution of the instruction, the circuit 210A or adder 212A or 218A issues a stall signal 215, to stall all following dependent instructions affected by the status of the mode bit 200A, till execution of the current instruction is complete.

Figure 4C:
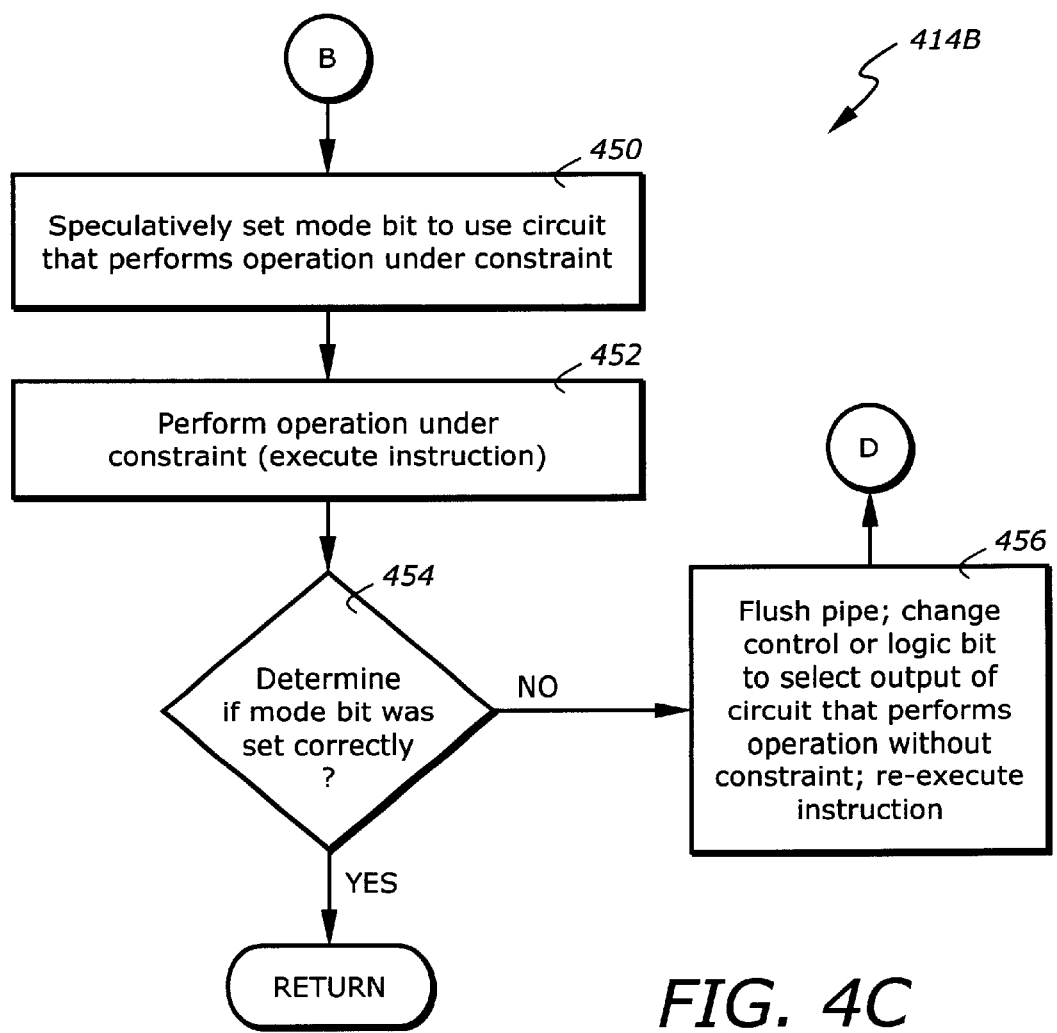
FIG. 4C is a flowchart illustrating a second embodiment of process block 414 of FIG. 4A.

FIG. 4C is a flowchart illustrating a second embodiment of the process block 414 of FIG. 4A. In this embodiment, process block 414A of FIG. 4A is replaced with the process block 414B, which represents option B. Process block 414B proceeds by speculatively setting the mode bit 200A to use the circuit that performs the operation under constraint, as shown in process block 450. The process 414B then advances to process block 452, where it performs the operation under the constraint. Next, the process 414B proceeds to decision block 454, where it determines if the mode bit 200A was set correctly. If so, the process 414B returns to the process block 420 in the main process 400A. Otherwise, the process 414B proceeds to process block 456, where it flushes the execution pipelines, changes a logic bit in the control unit 200 to select the output of a circuit that performs the operation without the constraint. The instruction is then re-executed. The process 414B then proceeds back to the decision block 412 in FIG. 4A.

Figure 4D:
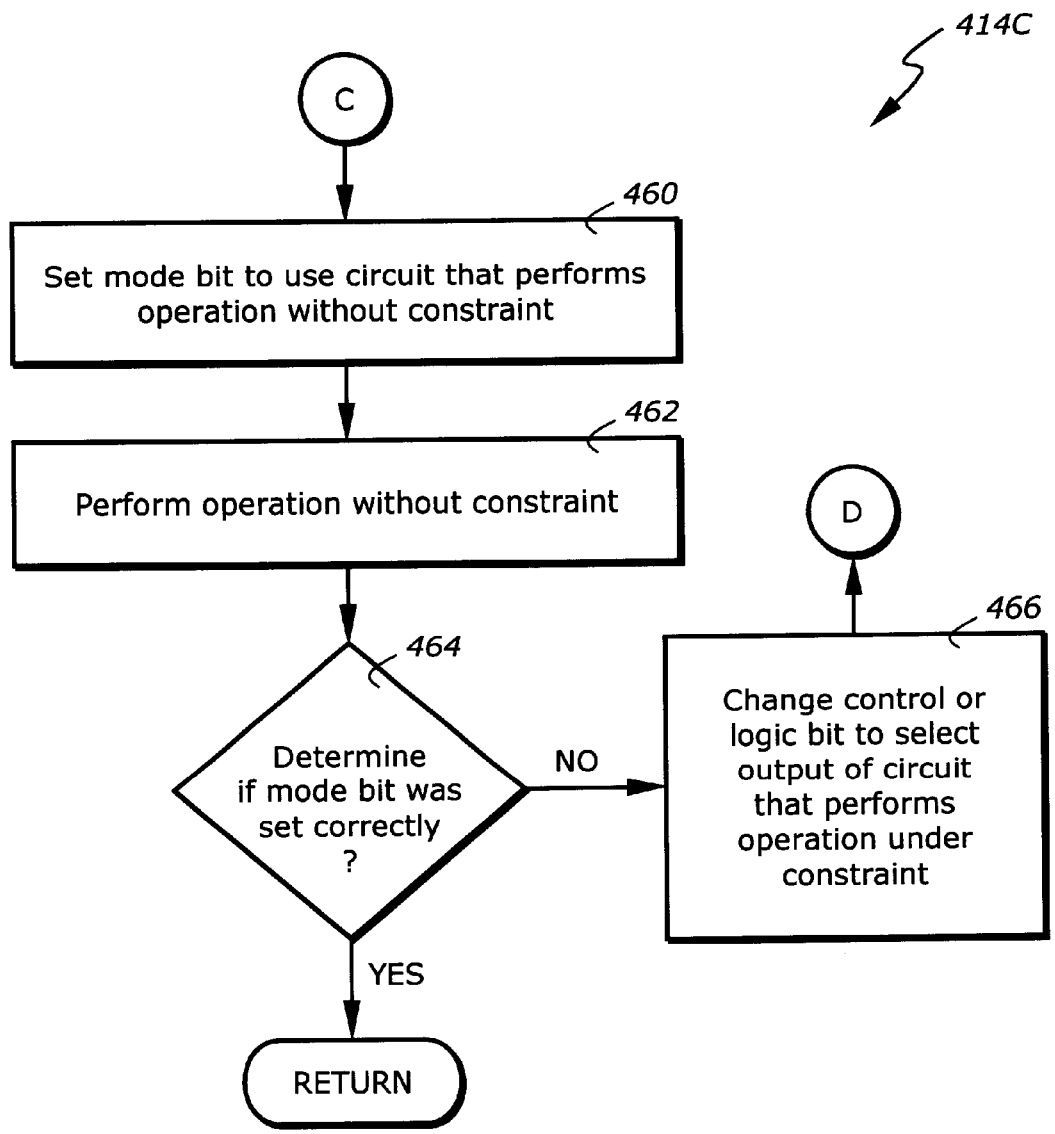
FIG. 4D is a flowchart illustrating a third embodiment of process block 414 of FIG. 4A.

FIG. 4D is a flowchart illustrating a third embodiment of the process block 414 of FIG. 4A. In this embodiment, process block 414 of FIG. 4A is replaced with the process block 414C, which represents option C. Process block 414C proceeds by setting the mode bit 200A to use the circuit that performs the operation without the constraint, as shown in process block 460. The process 414C then advances to process block 462, where it performs the operation without the constraint. Next, the process 414C proceeds to decision block 464, where it determines if the mode bit 200A was set correctly. If so, the process 414C returns to the process block 420 in the main process 400A. Otherwise, the process 414C proceeds to process block 466, where changes a logic bit in the control unit 200 to select the output of the circuit that performs the operation under the constraint. The process 414C then proceeds back to the decision block 412 in FIG. 4A.

Figure 5A:
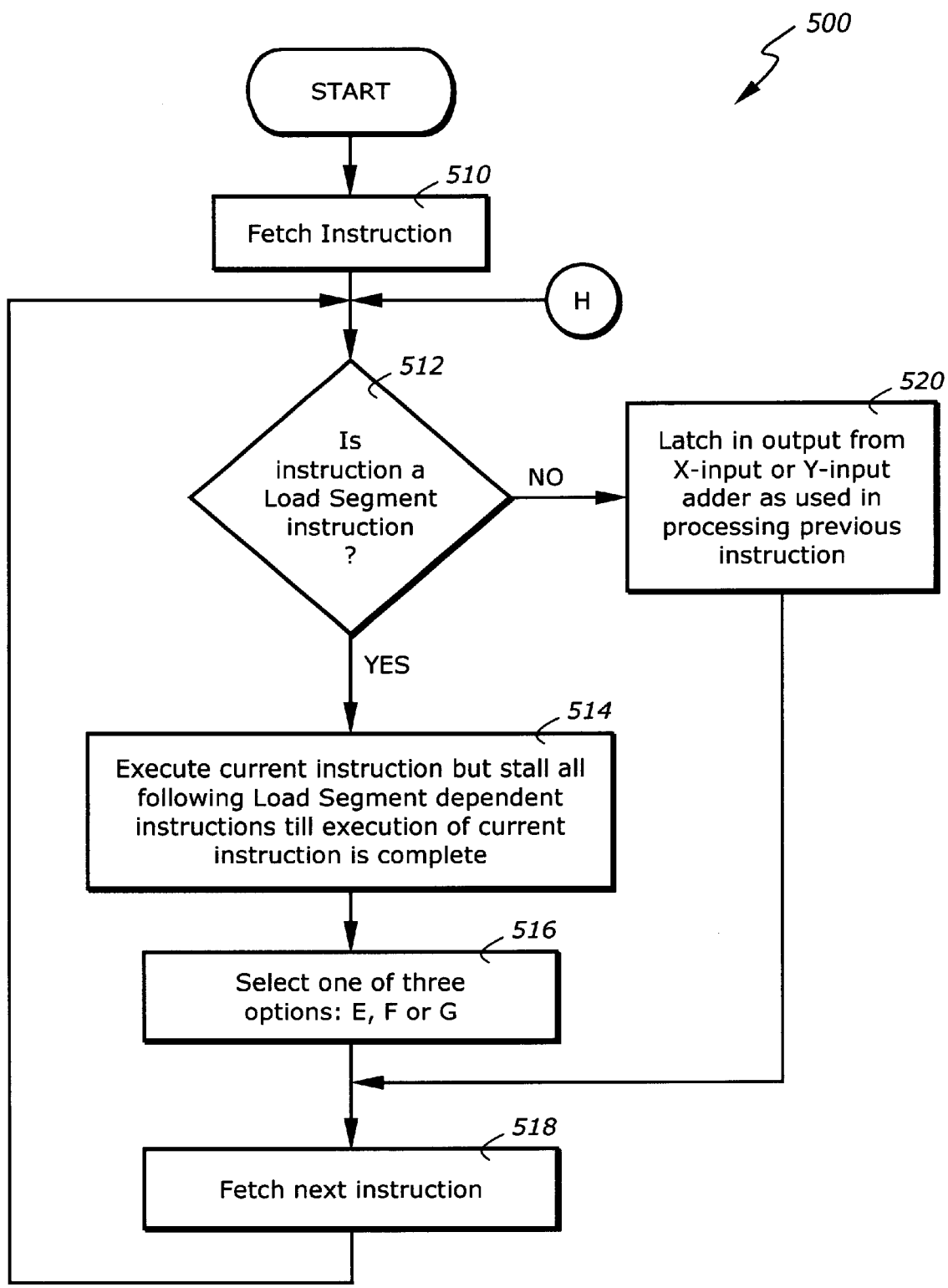
FIG. 5A is a flowchart illustrating one embodiment of the instruction processing method 400 of FIG. 4A, in accordance with the present invention.

FIG. 5A is a flowchart illustrating one embodiment of the instruction processing method 400 of FIG. 4A, in accordance with the present invention. The process 500 begins from a start state and proceeds to process block 512, where it determines if the instruction is a load segment instruction. Such a load segment instruction may be used for the computation of linear addresses, and may change the status of the mode bit 200A. If so, the process 500 proceeds to process block 514, where it executes the current instruction but stalls all following instructions dependent on the load segment instruction (for example, for computing an address), until the execution of the current instruction is complete. The process 500 then proceeds to process block 516, where one of three options E, F or G (shown in FIGS. 5B, C and D as processes 514E, 514F and 514G, respectively) is selected. The process 500 then proceeds to process block 518, where it fetches the next instruction. The process 500 then proceeds back to decision block 512. If, at decision block 512, the instruction is not a load segment instruction, the process proceeds to process block 520, where it latches the output from a X-input or Y-input adder as used in processing a previous instruction. The process 500 then proceeds to process block 518.

Figure 5B:
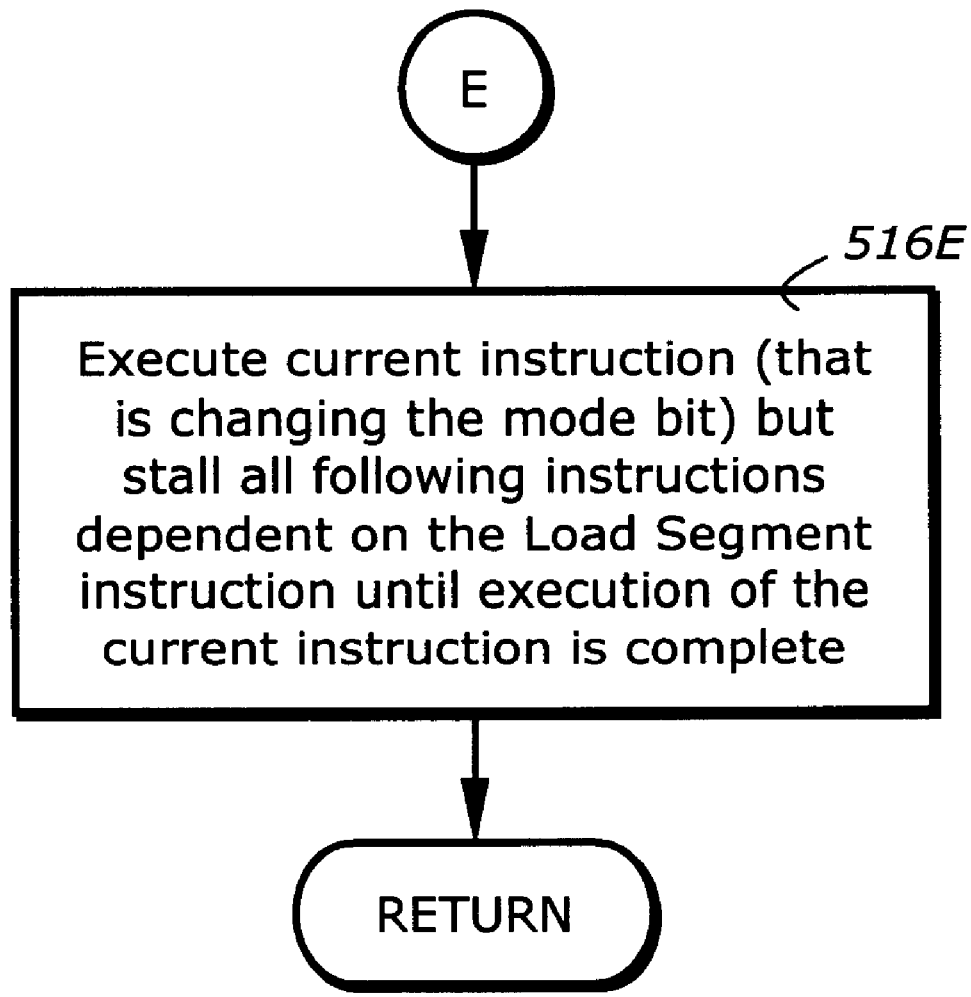
FIG. 5B is a flowchart illustrating one embodiment of the process 516 of FIG. 5A.

FIG. 5B is a flowchart illustrating one embodiment of process block 516 of FIG. 5A. In this embodiment, process block 516 of FIG. 5A is replaced with the process block 416E, which represents option E. FIG. 5B also represents one example of the process 414A of FIG. 4B. Here, the current instruction (that is changing the mode bit) is executed but all following instructions dependent on the load segment instruction are stalled until the execution of the current load segment instruction is complete.

Figure 5C:
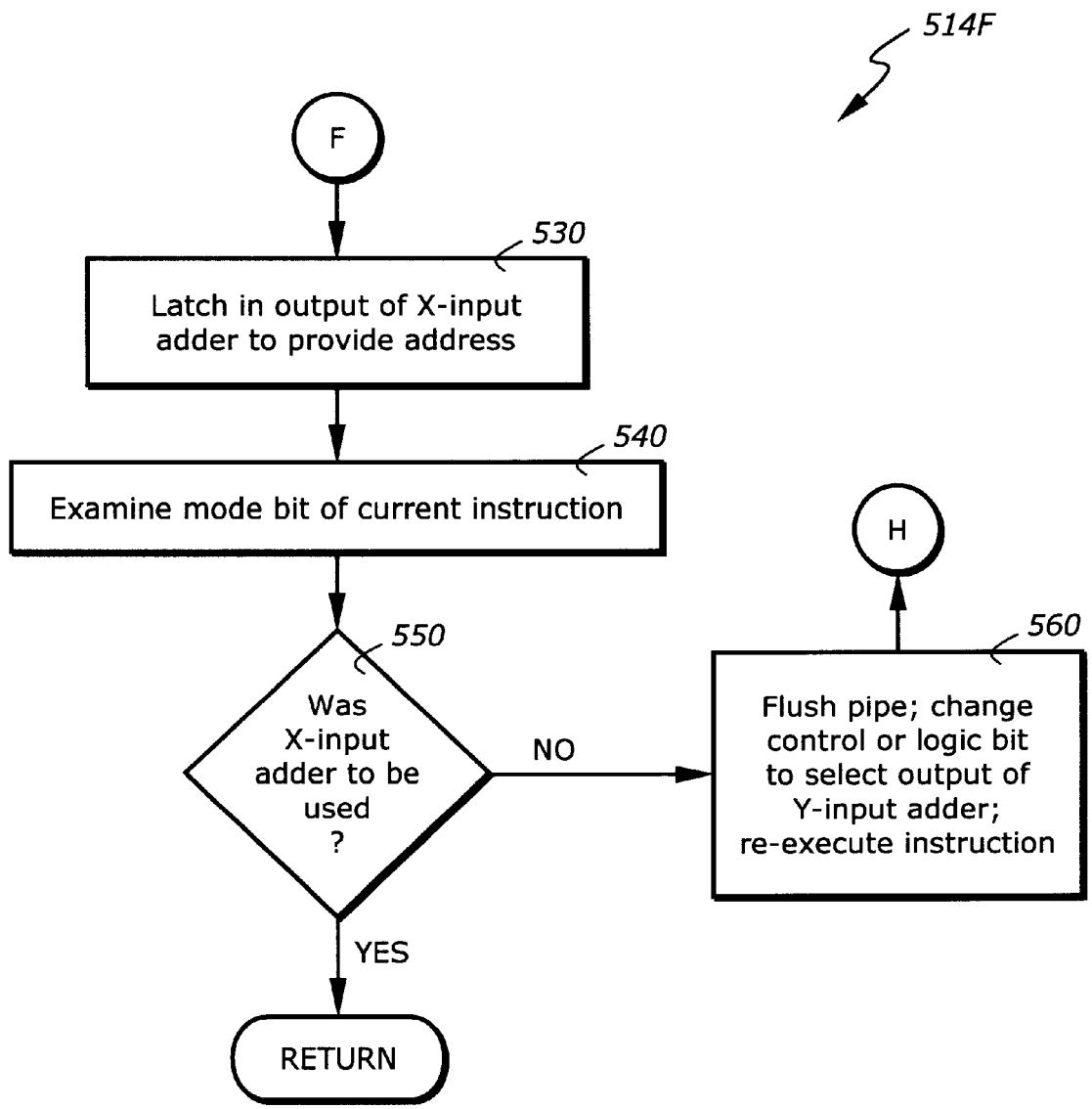
FIG. 5C is a flowchart illustrating a one embodiment of process 516 of FIG. 5A.

FIG. 5C is a flowchart illustrating a one embodiment of process block 516 of FIG. 5A. In this embodiment, process block 516 of FIG. 5A is replaced with the process block 514F, which represents option E. FIG. 5C also represents one example of the process 414B of FIG. 4C. Process 514F proceeds from process block 530, where it latches in the output of a X-input adder where X<Y (such as the X-input adder 212B of FIG. 2B or the 2-input adder 218B of FIG. 2C) to provide the required address. The process 514F then examines the mode bit 200A of the current instruction to determine if an X-input adder was to be used. The process then proceeds to process block 550, where it determines if a X-input adder was to be used. If so, the process returns to process block 518 of the main process 518. Otherwise, it proceeds to process block 560 where it flushes the execution pipeline, change the control or logic bit of the control unit 200 to select the output of the Y-input adder (such as the Y-input adder 212A of FIG. 2B or the 3-input adder 218A of FIG. 2C) for performing the operation. The instruction is then re-executed. The process 514F then proceeds to decision block 512 of the main process 500.

Figure 5D:
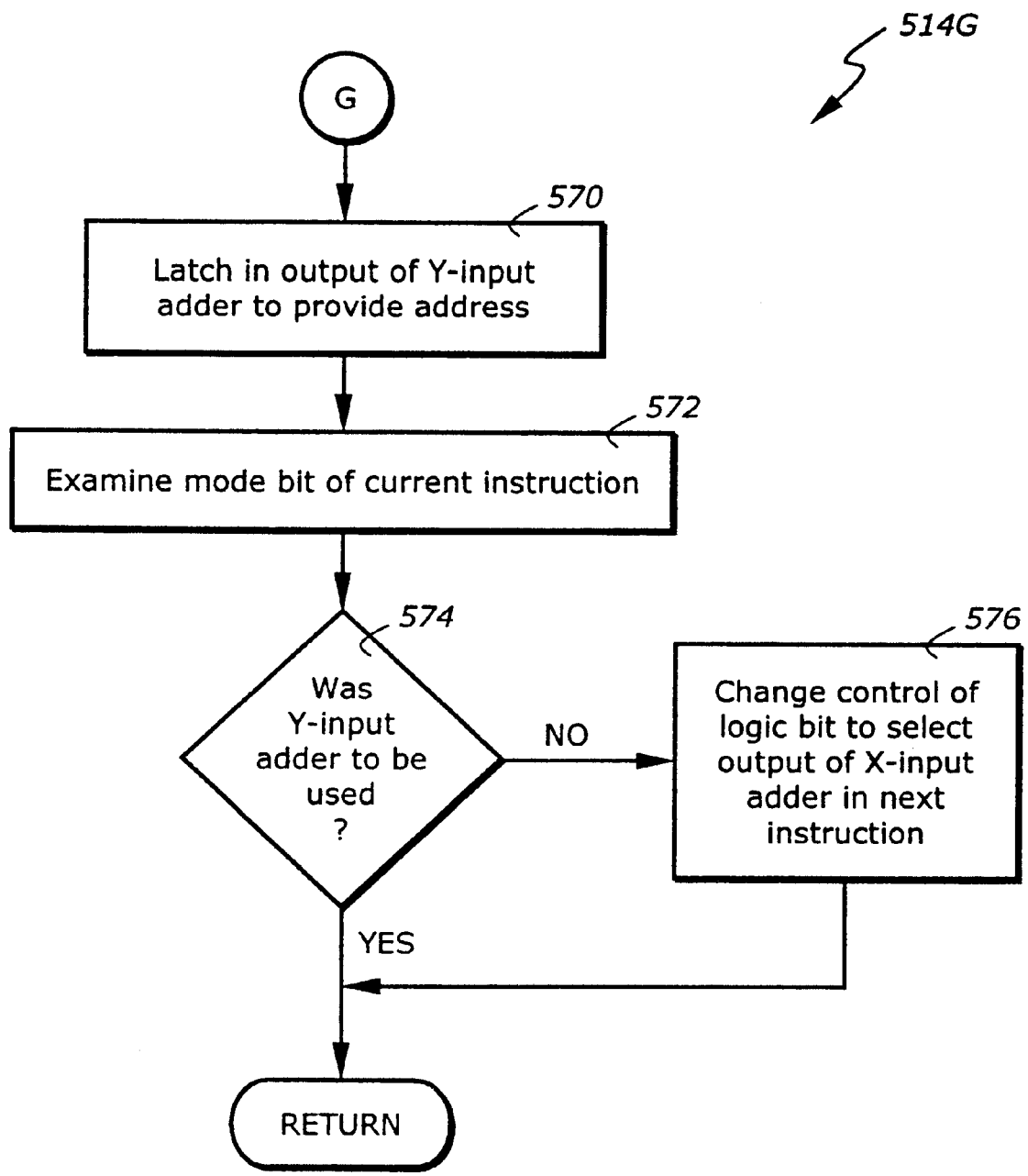
FIG. 5D is a flowchart illustrating one embodiment of process 516 of FIG. 5A.

FIG. 5D is a flowchart illustrating one embodiment of process $414A_3$ of FIG. 4D. In this embodiment, process block 516 of FIG. 5A is replaced with the process block 514G, which represents option G. FIG. 5D also represents one example of the process 414C of FIG. 4D. Process 514G proceeds from process block 570, where it latches in the output of a Y-input adder where X<Y (such as the Y-input adder 212A of FIG. 2B or the 3-input adder 218A of FIG. 2C) to provide the required address. The process 514G then proceeds to process block 572, where it examines the mode bit 200A associated with the instruction to determine if a Y-input adder was to be used. Next, the process 514G proceeds to decision block 574, where it determines if a Y-input adder was to be used. If so, the process 514G returns to process block 518 of the main process 500. Otherwise, the process 514G proceeds to process block 576, where it changes the control or logic bit of the control unit 200 to select the output of the X-input adder in the next operation. The process 514G then proceeds to process block 518 of the main process 500.

The present invention thus provides an apparatus and method for efficiently processing instructions. The present invention also provides an apparatus and method for providing efficient address computation. As a result, system performance is increased.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A processor comprising:
    a control unit to control execution of an instruction decoded by a decode unit; and
    first and second circuits coupled to the control unit to perform first and second operations under first and second conditions, respectively, the first and second circuits excluding the decode unit;
    said control unit determining if the instruction is to be performed under the second condition, if so, selecting the second circuit to process said instruction, otherwise selecting said first circuit to process said instruction.

2. The processor of claim 1, wherein said first condition is to perform the first operation in N cycles and said second condition is to perform the second operation in M cycles, wherein M<N.

3. The processor of claim 1, where said first condition is to perform the first operation using the first circuit having X inputs and said second condition is to perform the second operation using the second circuit having Y inputs, where X<Y.

4. The processor of claim 1, wherein the control unit has a mode bit, said control unit determining selection of the first or second circuit based on the mode bit.

5. The processor of claim 4, wherein the control unit further comprises a second mode bit, the processor further having third and fourth circuits, the control unit selecting one of the circuits for performing an operation based on a value of said first and said second mode bits.

6. A processor comprising:
    a control unit having a mode bit to control execution of an instruction decoded by a decode unit; and
    first and second circuits coupled to the control unit to perform first and second operations under first and second conditions, respectively, the first and second circuits excluding the decode unit;
    said control unit determining if the instruction alters the mode bit, if so, executing the current instruction but stalling all following dependant instructions affected by the mode bit until execution of the current instruction is complete.

7. The processor of claim 6, wherein the instruction is a load segment intruction.

8. The processor of claim 6, wherein said control unit executes processing of the current instruction in accordance with processing of a previous instruction if the current instruction does not alter the mode bit.

9. A processor comprising:
    a control unit having a mode bit to control execution of an instruction decoded by a decode unit; and
    first and second circuits coupled to the control unit to perform first and second operations under first and second conditions, respectively, the first and second circuits excluding the decode unit;
    said control unit determining if the instruction alters the mode bit, if so, setting the mode bit to select use of the second circuit for processing the instruction, determining if the mode bit was set correctly upon processing of the instruction, if not, resetting the mode bit to select use of the first circuit for reprocessing the instruction.

10. The processor of claim 9, wherein the instruction is a load segment instruction.

11. The processor of claim 9, wherein said control unit executes processing of the current instruction in accordance with processing of a previous instruction if the current instruction does not alter the mode bit.

12. The processor of claim 9, wherein said second circuit has X inputs and said first circuit has Y inputs, where X<Y.

13. A processor comprising:
    a control unit having a mode bit to control execution of an instruction decoded by a decode unit; and
    first and second circuits coupled to the control unit to perform first and second operations under first and second conditions, respectively, the first and second circuits excluding the decode unit;
    said control unit determining if the instruction alters the mode bit, if so, setting the mode bit to select use of the first circuit for processing a current instruction, determining if the mode bit was set correctly upon processing of the instruction, if not, resetting the mode bit to select use of the second circuit for processing a following instruction.

14. The processor of claim 13, wherein the instruction is a load segment instruction.

15. The processor of claim 13, wherein said control unit executes processing of the current instruction in accordance with processing of a previous instruction if the current instruction does not alter the mode bit.

16. The processor of claim 14, wherein said second circuit has X inputs and said first circuit has Y inputs, where X<Y.

17. A method comprising:
controlling execution of an instruction decoded by a decode unit; and
providing, first and second circuits to perform first and second operations under first and second conditions, respectively. the first and second circuits excluding the decode unit;
said controlling comprises determining if processing of the instruction is to be performed under the second condition, if so, selecting the second circuit to process the instruction, otherwise selecting the first circuit to process the instruction.

18. The method of claim 17, wherein said first condition is to perform the first operation in N cycles and said second condition is to perform the second operation in M cycles, wherein M<N.

19. The method of claim 17, where said first condition is to perform the first operation using a circuit having X inputs and said second condition is to perform the second operation using a circuit having Y inputs, where X<Y.

20. The method of claim 17, wherein determining if processing of the introduction comprises:
examining a mode bit;
determining if processing of the instructions is to be performed under the second condition based on a value of the mode bit; if so, selecting the second circuit to process the instruction, otherwise selecting the first circuit to process the instruction.

21. The method of claim 17, further comprising:
providing a third and a fourth circuit, said third and fourth circuits performing a third and a fourth operation;
examining a value of a mode register,
selecting one of the first, second, third or fourth circuits to process the instruction based on the value.

22. A method comprising:
controlling execution of an instruction decoded by a decode unit; and
providing first and second circuits to perform first and second operations under first and second conditions, respectively, the first and second circuits excluding the decode unit;
said controlling comprises determining if the instruction alters an operational mode, if so, executing the current instruction but stalling all following dependent instructions affected by the mode bit until execution of the current instruction is complete.

23. The method of claim 22, wherein the instruction is a load segment instruction.

24. The method of claim 22, further comprising processing of the current instruction in accordance with processing of a previous instruction if the current instruction does not alter the operational mode.

25. A method comprising:
controlling execution of an instruction decoded by a decode unit; and
providing first and second circuits to perform first and second operations under first and second conditions, respectively, the first and second circuits excluding the decode unit;
said controlling comprises
determining if the instruction alters an operational mode, if so, selecting the second circuit for processing the instruction; and
determining if selection of the second circuit for processing the instruction was in accordance with the alteration of the operational mode upon processing of the instruction, if not, altering the operational mode to select the first circuit for re-processing the instruction.

26. The method of claim 24, wherein the instruction is a load segment instruction.

27. The method of claim 26, further comprising processing of the current instruction in accordance with processing of a previous instruction if the current instruction does not alter the operational mode.

28. The method of claim 25, wherein said second circuit has X inputs and said first circuit has Y inputs, where X<Y.

29. The method of claim 25, wherein determining if the instruction alters an operational mode comprises determining if a mode bit of the processor-based system is altered.

30. A method comprising:
controlling execution of an instruction decoded by a decode unit; and
providing first and second circuits to perform first and second operations under first and second conditions, respectively, the first and second circuits excluding the decode unit;
said controlling comprises
determining if the instruction alters an operational mode, if so, altering the operational mode to select the first circuit for processing a current instruction; and
determining if the operational mode was correctly altered upon processing of the instruction, if not, resetting the operational mode to select use of second circuit for processing a following instruction.

31. The method of claim 30, wherein the instruction is a load segment instruction.

32. The method of claim 31, further comprising processing of the current instruction in accordance with processing of a previous instruction if the current instruction does not alter the operational mode.

33. The method of claim 32, wherein said second circuit has X inputs and said first circuit has Y inputs, where X<Y.

34. A processing system comprising:
a decode unit to decode an instruction;
a control unit coupled the decode unit to control execution of the instruction; and
first and second circuits coupled to the control unit to perform first and second operations under first and second conditions, respectively, the first and second circuits excluding the decode unit;
said control unit determining if the instruction is to be performed under the second condition, if so, selecting the second circuit to process said instruction, otherwise selecting said first circuit to process said instruction.

35. A processing system comprising:
a decode unit to decode an instruction;
a control unit coupled the decode unit to control execution of the instruction, the control unit having a mode bit; and
first and second circuits coupled to the control unit to perform first and second operations under first and second conditions, respectively, the first and second circuits excluding the decode unit;

said control unit determining if the instruction alters the mode bit, if so, executing the current instruction but stalling all following dependent instructions affected by the mode bit until execution of the current instruction is complete.

36. A processing system comprising:

a decode unit to decode an instruction;

a control unit coupled the decode unit to control execution of the instruction, the control unit having a mode bit; and first and second circuits coupled to the control unit to perform first and second operations under first and second conditions, respectively, the first and second circuits excluding the decode unit;

said control unit determining if the instruction alters the mode bit, if so, setting the mode bit to select use of the second circuit for processing the instruction, determining if the mode bit was set correctly upon processing of the instruction, if not, resetting the mode bit to select use of the first circuit for re-processing the instruction.

37. A processing system comprising:

a decode unit to decode an instruction;

a control unit coupled the decode unit to control execution of the instruction, the control unit having a mode bit; and first and second circuits coupled to the control unit to perform first and second operations under first and second conditions, respectively, the first and second circuits excluding the decode unit;

said control unit determining if the instruction alters the mode bit, if so, setting the mode bit to select use of the first circuit for processing a current instruction, determining if the mode bit was set correctly upon processing of the instruction, if not, resetting the mode bit to select use of the second circuit for processing a following instruction.

* * * * *